(12) United States Patent
Wang

(10) Patent No.: US 12,512,098 B2
(45) Date of Patent: Dec. 30, 2025

(54) APPARATUS, PLATFORM, METHOD AND MEDIUM FOR INTENTION IMPORTANCE INFERENCE

(71) Applicant: SoundHound, Inc., Santa Clara, CA (US)

(72) Inventor: Chong Wang, Shenzhen (CN)

(73) Assignee: SoundHound AI IP, LLC., Santa Clara, CA (US)

( * ) Notice: Subject to any disclaimer, the term of this patent is extended or adjusted under 35 U.S.C. 154(b) by 402 days.

(21) Appl. No.: 17/820,660

(22) Filed: Aug. 18, 2022

(65) Prior Publication Data

US 2023/0386459 A1 Nov. 30, 2023

(30) Foreign Application Priority Data

May 25, 2022 (CN) .......................... 202210572663.5

(51) Int. Cl.
  *G10L 15/22* (2006.01)
  *G06F 16/9535* (2019.01)
  *G10L 15/16* (2006.01)

(52) U.S. Cl.
  CPC .......... *G10L 15/22* (2013.01); *G06F 16/9535* (2019.01); *G10L 15/16* (2013.01); *G10L 2015/225* (2013.01)

(58) Field of Classification Search
  CPC ................................ G10L 15/22; G06F 40/30
  See application file for complete search history.

(56) References Cited

U.S. PATENT DOCUMENTS

| | | | |
|---|---|---|---|
| 2017/0213274 A1* | 7/2017 | Vijayaraghavan | ........................... G06Q 30/0631 |
| 2018/0293221 A1* | 10/2018 | Finkelstein | ............ G06N 20/00 |
| 2018/0330248 A1* | 11/2018 | Burhanuddin | ............ G06N 7/01 |
| 2019/0236204 A1* | 8/2019 | Canim | ................. G10L 15/1815 |
| 2021/0350209 A1* | 11/2021 | Wang | ........................ G06N 3/08 |
| 2022/0223146 A1* | 7/2022 | Aili | .......................... G06F 40/30 |

OTHER PUBLICATIONS

Baotian Hu, et al., "Convolutional Neural Network Architectures for Matching Natural Language Sentences" Advances in neural information processing systems 27 (2014).
Cerence Cognitive Arbitration fact sheet, published by the company Cerence. https://www.cerence.com.

(Continued)

*Primary Examiner* — Jialong He
(74) *Attorney, Agent, or Firm* — Platinum Intellectual Property PC

(57) ABSTRACT

The application provides an apparatus, platform, method and medium for intention importance interference. The apparatus includes an interface configured to receive user-related information; and a processor coupled to the interface and configured to: extract data related to different aspects of a user from the user-related information; generate a plurality of intention probes based on the data related to different aspects of the user, each intention probe comprising an intention and associated data items; infer an importance of each intention probe by calculating a score of each associated data items of the intention probe based on the data related to different aspects of the user; and provide information associated with an intention probe with a highest importance.

21 Claims, 5 Drawing Sheets

(56) References Cited

OTHER PUBLICATIONS

Mingyang Song, et al., "Importance Estimation from Multiple Perspectives for Keyphrase Extraction", arXiv:2110.09749v4 [cs.CL] Nov. 11, 2021.

Shiliang Sun et al., "A Review of Natural Language Processing Techniques for Opinion Mining Systems", Information fusion 36 (2017): 10-25.

Zhuyun Dai, et al., "Context-Aware Sentence/Passage Term Importance Estimation for First Stage Retrieval", arXiv:1910.10687v2 [cs.IR] Nov. 26, 2019.

* cited by examiner

| DATA TYPE | VALUE |
|---|---|
| Age | 35 |
| Location history | ... |
| Profession | Doctor |
| Child | 1: 3-years old |
| Contact list | ... |
| Hobby | Cooking |
| Calendar appointments | ... |
| Message history | ... |
| Video watching history | ... |
| Most recent name spoken | ... |
| Current geolocation | 48.8543,2.3480 |
| Current speed | 0 |
| Current weather | 20 degrees, rain |
| Time to next appointment | 34 minutes |
| Time since previous trigger | 155 seconds |
| ... | |

Real-time user data

*FIG. 2*

Intention probe instance 300

Intention 310:
one or more activities

| When | Where | Who | Why | How | ...... |
|------|-------|-----|-----|-----|--------|
| ...... | ...... | ...... | ...... | ...... | |

*FIG. 3*

APPARATUS, PLATFORM, METHOD AND MEDIUM FOR INTENTION IMPORTANCE INFERENCE

CROSS-REFERENCE TO RELATED APPLICATION

This application is a Non-provisional Application under 35 USC § 111(a), which claims priority to Chinese Patent Application Serial No. 202210572663, filed on May 25, 2022, the disclosure of all of which is hereby incorporated by reference in its entirety.

BACKGROUND

With the popularization of smart electronic devices, people can perform more and more activities, such as communication, conference, itinerary planning, online shopping, mobile payment and the like, with the smart electronic devices. People hope that the smart electronic devices can more and more "understand" user's mind, and "automatically" recommend information related to an activity that the user most wants to perform, so as to bring more convenience to people's daily life and work.

SUMMARY

An aspect of the present application provides a data processing apparatus. The apparatus includes an interface configured to receive user-related information; and a processor coupled to the interface and configured to: extract data related to different aspects of a user from the user-related information; generate a plurality of intention probes based on the data related to different aspects of the user, each intention probe comprising an intention and associated data items; infer an importance of each intention probe by calculating a score of each associated data items of the intention probe based on the data related to different aspects of the user; and provide information associated with an intention probe with a highest importance.

Another aspect of the present application provides a data processing method. The method includes receiving user-related information; extracting data related to different aspects of a user from the user-related information; generating a plurality of intention probes based on the data related to different aspects of the user, each intention probe comprising an intention and associated data items; inferring an importance of each intention probe by calculating a score of each associated data items of the intention probe based on the data related to different aspects of the user; and providing information associated with an intention probe with a highest importance.

Another aspect of the present application provides a computer-readable storage medium having instructions stored thereon, the instructions, when executed by a processor, implementing the above-mentioned data processing method.

Another aspect of the present application provides a data management platform including the above-mentioned data processing apparatus.

BRIEF DESCRIPTION OF THE DRAWINGS

Particular features, aspects and advantages of the present application will be better understood with reference to the following description and accompanying drawings, wherein:

FIG. 2 shows a schematic diagram of an example of a data structure related to different aspects of a user according to some embodiments of the present disclosure.

FIG. 3 shows a schematic diagram of an intention probe instance according to some embodiments of the present disclosure.

DETAILED DESCRIPTION

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly herein. The phrase generally does not refer to the same embodiments; however, it may. The terms "comprising," "having," and "including" are synonymous, unless the context dictates otherwise. The phrases "A or B" and "A/B" mean "(A), (B), or (A and B)."

People can perform more and more activities, such as communication, conference, itinerary planning, online shopping, mobile payment and the like, with the smart electronic devices. During the performance of these activities, machine/computer readable information that can be understood by a data processing apparatus (e.g., a computer, a server, etc.) with a data processing capability will be generated. Such machine/computer readable information may be in a variety of forms, of which, common forms may include a form of text, a form of picture, a form of audio (e.g., a voice query input of a user, a recording of an audio or video call, voicemail messages, or sound clips etc.), a form of signal (e.g., a user's touch input to an electronic device), and so forth.

The apparatus, platform, method and medium provided by embodiments of the present disclosure are capable of collecting machine/computer readable information, predicting one or more activities (referred to as "intention" herein) that a user is to perform in the future by analyzing the information, inferring an importance of each intention, and recommending information associated with the most important intention (i.e., the activity that the user most wants to perform at a certain location and in a certain period of time), with a benefit of preventing the user from forgetting important activity and facilitating the user performing that activity.

Figure 1:
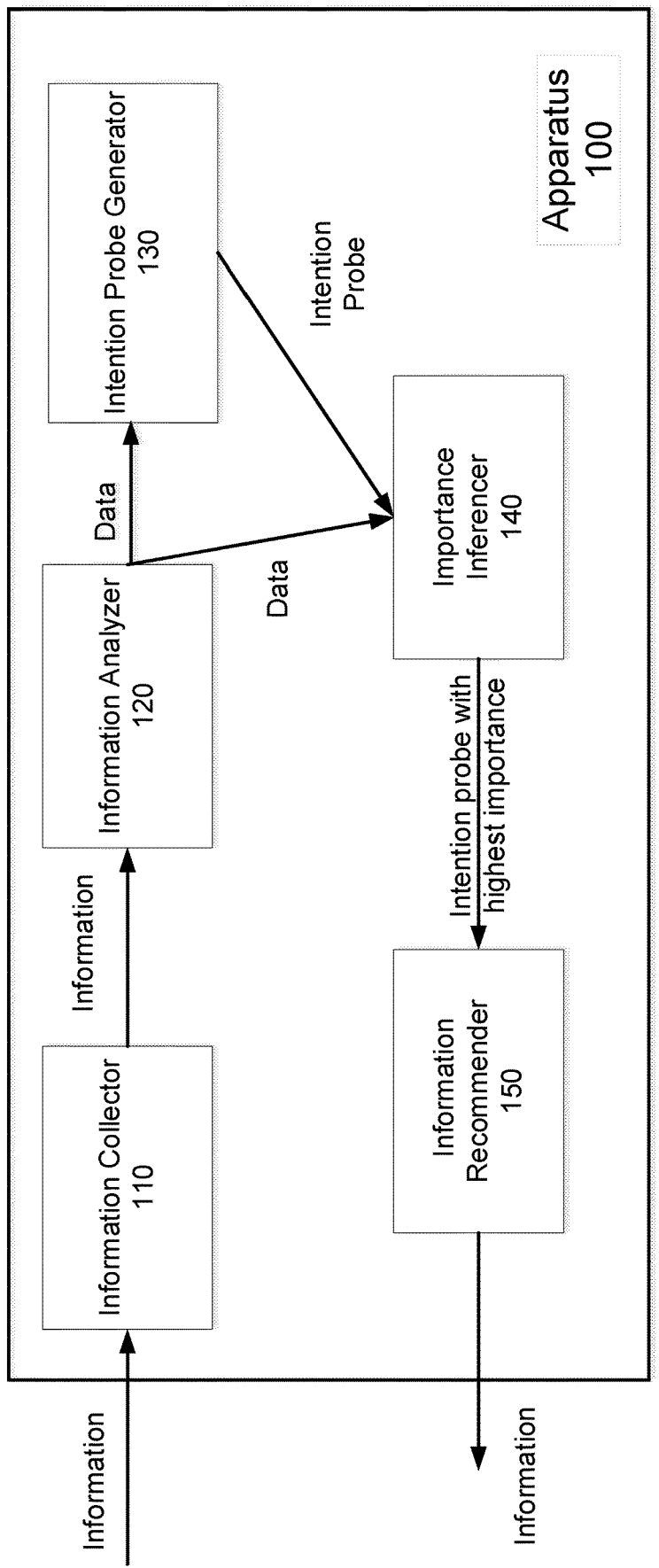
FIG. 1 shows a schematic block diagram of an apparatus for intention importance interference according to some embodiments of the present disclosure.

FIG. 1 shows a schematic block diagram of an apparatus 100 for intention importance interference according to some embodiments of the present disclosure. As shown in FIG. 1, the apparatus 100 may include an information collector 110 configured to collect information related to a particular user. The "particular user" herein refers to a person whose future activity is to be predicted, i.e., a person who generates an intention. The information collector 110 can collect information related to the particular user from the same channel or from different channels. The "Channel(s)" herein may refer to ways that can be used to obtain the information related to the particular user. Specifically, the channel(s) may include, for example, an application account associated with the particular user's identity information, such as a search engine (e.g., Google, Baidu, etc.), a social software (e.g., Facebook, WeChat, etc.) account, a shopping software (e.g., Amazon, Taobao, Jingdong, etc.) account, a life service software (such as Yelp, Meituan-Dianping, Ele.me, etc.) account, an itinerary planning software (such as, Google Maps, Baidu map, AutoNavi map, etc.) account, and the like; and various electronic devices frequently used by the particular user, for example, the particular user's mobile phone, tablet computer, laptop computer, personal digital assistant, smart home appliance, in-vehicle electronic device, work computer, etc. The particular user's social information, shopping information, eating habits, shopping preferences, itinerary information, transportation modes etc. may be collected through the application accounts associated with the particular user's identity information. Through the various electronic devices frequently used by the particular user, it is possible to understand the particular user's usage behaviors on the electronic devices, for example, using various applications installed on the electronic devices to make audio or video calls, editing and sending/receiving text messages, playing games, playing music or video, etc.; and the particular user's usage habits of the electronic devices, for example, timing and location information, e.g. when and where the particular user uses the electronic devices, what type of information is preferred, or what information is always viewed first, and so on.

In particular, the information collector 110 may also be configured to collect audio information, for example, telephone and voicemail messages, audio clips, recordings of meetings, and the like. Moreover, currently, more and more everyday devices (e.g., appliances, vehicles, mobile devices, etc.) are equipped with Automatic Speech Recognition (ASR) and Natural Language Understanding (NLU) capabilities, so that voice assistants on these devices can also serve as a channel of user information. The information collector 110 may be configured to collect voice information related to the particular user from the voice assistants of the everyday devices used by the particular user. Particularly, in some embodiments, for audio information, the information collector 110 can automatically create transcripts of audio messages through ASR. Optionally, the information collector 110 can extract text abstracts from the transcripts of the audio messages, e.g., through a text extraction model.

For example, Tom works in an international trade company, and because of the different time-zones, he often has to make meetings with colleagues from other time-zones during non-regular working hours. One day, while Tom was driving home after work time, he received a call from his manager asking him to join a conference call. Tom accepted the conference invitation and joined the meeting. Tom could not manually record the relevant content of the conference because he was driving. The information collector 110 can automatically create transcripts of voice messages in the conference call through ASR, and provide the transcripts to Tom, for example, by emails, instant messages etc. Optionally, the information collector 110 may further extract text abstracts from the transcripts of the voice messages, so as to help Tom quickly recall the content of the meeting, since the conference calls tend to be long. In the present disclosure, intention probes can be generated and an importance of each intention probe can be inferred, according to the transcripts or the abstracts of the messages generated by the information collector 110, which will be described below.

The apparatus 100 may further include an information analyzer 120. The information analyzer 120 is configured to analyze the information collected by the information collector 110 and extract therefrom data related to different aspects of the particular user. The "different aspects" herein may include various aspects related to clothing, food, housing and transportation of the particular user, for example, clothing style, such as the user's preference for sports and leisure style clothes; the eating habit, such as the user's preference for hamburgers; the travel habit, such as what theme and price for a hotel the user likes; the transportation habit, such as whether the user prefers to take a plane or a train; and the like, which will not be listed one by one herein. FIG. 2 shows a schematic diagram of an example of a data structure related to different aspects of the user according to some embodiments of the present disclosure.

The apparatus 100 may further include an intention probe generator 130. After the information analyzer 120 extracts the data related to different aspects of the particular user, the apparatus 100 may utilize the intention probe generator 130 to generate a plurality of intention probes based on the data related to different aspects of the particular user. The plurality of intention probes relate to different aspects or the same aspect. Each intention probe may include an intention and associated data items. As mentioned above, the intention refers to an activity that the user is to perform in the future (i.e., "what"). For example, in some embodiments, the associated data items may be defined as data associated with the activity to be performed by the user, e.g., the time ("when"), the place ("where"), the people ("who"), the reason ("why"), and the implementation ("how"), etc.

Programming languages such as CaiLan/Terrier (CaiLan/Terrier is a programming language used to describe natural language algorithms) can enable any software developer to optimize their intention learning. The "software developer" herein refers to individuals or companies capable of independently developing system software or application software. For example, if A is an independent software vendor for video conferencing (e.g., Microsoft Teams, Tencent Meetings, etc.), A is more concerned with business and business-related "intentions"; and if B provides video calling capabilities for children (e.g., video software in children's phone watches and learning tablets, etc.), B pays more attention to the "intention" related to fun or going out to play.

In some embodiments, the intention probe generator 130 upon detection of an intention in the data related to different aspects of the particular user, generates an intention probe corresponding to the intention; and keeps the corresponding intention probe active until the intention happens or expires. For example, the information collector 110 collects the following information: a user, for example, Tom, receives an email late on Wednesday; the information analyzer 120 extracts from this information that the customer asked Tom to reply by 6 p.m. on Friday; the intention probe generator 130 generates an intention probe, which may be described as "replying to customer email+by 6 p.m. on Friday+ . . . ". The intention probe remains active even though the next day is Thursday and has a higher priority each time Tom checks his schedule, until the information collector 110 collects that Tom has replied to the client's email or the intention probe has expired (i.e., the time passes 6 p.m. Friday).

FIG. 3 shows a schematic diagram of an intention probe instance 300 according to some embodiments of the present disclosure. As shown in FIG. 3, the intention probe instance 300 may include an intention 310 to describe one or more activities to be performed, e.g., making a phone call, grocery shopping and cooking, or going to a concert, etc. Intention probe instance 300 may also include data items associated with the one or more activities to be performed, for example, when to perform the one or more activities, e.g., making the phone call [by 12 a.m. tomorrow], grocery shopping and cooking [after work at night], going to the concert [at 20:00 p.m. on Saturday], etc.; where to perform the one or more activities, e.g., making the phone call [at the office], grocery shopping [in the supermarket] and cooking [at home], going to the concert [at the city stadium], etc.; who will perform the one or more activities, e.g., [I (i.e., the particular user)] will make a call to the customer, [I] will go grocery shopping and do cooking, [I and Tom] will go to the concert, etc.; why to perform the one or more activities, e.g., making the phone call [for negotiating of cooperation], grocery shopping and cooking [for a family dinner], going to the concert [of the favorite band]; and how to perform the one or more activities, e.g., making the phone call [by the customer's phone number], grocery shopping and cooking [based on a list of food to be purchased], going to the concert [to seat at a particular seat number], etc. It should be noted that not every intention probe instance needs to include all the above-mentioned associated data items, and for a particular intention, one or more of the above associated data items may be defaulted.

As further shown in FIG. 1, the apparatus 100 may further include an importance inferencer 140. The importance inferencer 140 is configured to infer an importance of each intention probe by calculating a score of each associated data items of the intention probe based on the data related to different aspects of the user. Some embodiments of an importance inference dynamically adjust the score.

In particular, the importance inferencer 140 may calculate a score for each data item in each intention probe (which may be any one of the when, where, who, why and how data items in the intention probe instance 300), and obtain a score for each intention probe by calculating a sum of scores of the individual data items included in the intention probe, so as to infer the importance of the intention probe based on the score for the intention probe.

As further shown by the intention probe instance 300 of FIG. 3, for example, for the when data item, the scores decrease in an order of time from sooner to later. For example, for illustrative purposes only, an example of durations from the times in the when data item to the current time and their corresponding scores is shown in Table 1.

TABLE 1

| Duration to the current time | Score |
| --- | --- |
| Less than or equal to 1 hour | 10 |
| Greater than 1 hour and less than or equal to 3 hours | 9 |

TABLE 1-continued

| Duration to the current time | Score |
| --- | --- |
| Greater than 3 hours and less than or equal to 6 hours | 8 |
| Greater than 6 hours and less than or equal to 12 hours | 7 |
| Greater than 12 hours and less than or equal to 24 hours (i.e., one day) | 5 |
| Greater than 24 hours and less than or equal to 48 hours | 4 |
| Greater than 48 hours and less than or equal to 168 hours (i.e., one week) | 3 |
| Greater than 168 hours and less than or equal to 1 month | 2 |
| Greater than 1 month or default | 1 |

The time intervals and corresponding scores shown in Table 1 are just examples, and more dense or sparse time intervals and corresponding scores may be set according to specific situations of users. Further, other scoring systems may also be used.

As further shown by the intention probe instance 300 of FIG. 3, for example, for the where data item, the scores decrease in an order of distance from near to far. For example, for illustrative purposes only, an example of distances from the positions in the where data item to the current position and their corresponding scores is shown in Table 2.

TABLE 2

| Distance from the current position | Score |
| --- | --- |
| Less than or equal to 500 meters | 10 |
| Greater than 500 meters and less than or equal to 1 kilometer | 9 |
| Greater than 1 kilometer and less than or equal to 2 kilometers | 8 |
| Greater than 2 kilometers and less than or equal to 5 kilometers | 7 |
| Greater than 52 kilometers and less than or equal to 10 kilometers | 5 |
| Greater than 10 kilometers and less than or equal to 20 kilometers | 4 |
| Greater than 20 kilometers and less than or equal to 50 kilometers | 3 |
| Greater than 50 kilometers and less than or equal to 100 kilometers | 2 |
| Greater than 100 kilometers or default | 1 |

The distances and corresponding scores shown in Table 2 are just examples, and more dense or sparse distance intervals and corresponding scores may be set according to specific situations of users. Further, other scoring systems may also be used.

As further shown by the intention probe instance 300 of FIG. 3, for example, for the who data item, scores may be set according to the relationships between the persons involved in the who data item and the particular user. For example, for illustrative purposes only, an example of relationships between the persons involved in the who data item and the particular user and corresponding scores is shown in Table 3.

TABLE 3

| Relationship with the particular user | Score |
| --- | --- |
| Family | 10 |
| Client | 8 |
| Colleague | 6 |
| Friend | 4 |
| General social relation or default | 2 |

The relationships and corresponding scores shown in Table 3 are only examples, and other relationship classifications and corresponding scores may be set according to specific situations of the users. Further, other scoring systems may also be used. A character relationship classification of the particular user and corresponding scores can be obtained by learning the daily behavior habits of the particular user. For example, a machine learning model can be used to gradually understand that the particular user pays more attention to information related to which person. For example, if the particular user always views a message from a family (a person A) firstly, as compared with a message from a colleague (a person B), the machine learning model can determine that a score for the person A is higher than that of the person B. It is not necessary for the machine learning model to know who is a family member or a colleague. the machine learning model simply needs to understand an activity associated with which person is more important to the particular user.

As further shown by the intention probe instance 300 of FIG. 3, for example, for the why data item, scores may be set according to the important levels of reasons. For example, for illustrative purposes only, an example of reason classifications and corresponding scores is shown in Table 4.

TABLE 4

| Reason classification | Score |
| --- | --- |
| Work matters | 10 |
| Everyday life | 8 |
| Anniversary or holiday | 6 |
| Daily activities | 4 |
| Other matters, such as games, recreations, etc., or default | 2 |

The reason classifications and corresponding scores shown in Table 4 are only examples, and other reason classifications and corresponding scores may be set according to specific situations of the users. Further, other scoring systems may also be used. The reason classifications and corresponding scores for the particular user can be obtained by learning the particular user's daily behavior habits. For example, a machine learning model can be used to gradually understand that the particular user pays more attention to which type of reason. For example, if the particular user always prioritizes work-related messages over game-related messages, the machine learning model can determine that the score for work matters is higher than that for game matters.

As further shown by the intention probe instance 300 of FIG. 3, for example, for the how data item, scores may be set according to difficulty levels of implementations. For example, for illustrative purposes only, an example of difficulty levels of implementations and corresponding scores is shown in Table 5.

TABLE 5

| Difficulty levels of implementations | Score |
| --- | --- |
| Difficult | 10 |
| General | 5 |
| Easy or default | 1 |

The difficulty levels of implementations and corresponding scores shown in Table 5 are only examples, and other implementation classifications and corresponding scores may be set according to specific situations of the users. Further, other scoring systems may also be used.

Additionally, the importance inferencer 140 may be further configured to set a corresponding weight for each data item when calculating the score of each intention probe, as shown by the following equation:

$$Score = S_1 W_1 + S_2 W_2 + \ldots + S_n W_n,$$

where "Score" denotes the score of each intention probe, $S_1$ and $W_1$ are a score and weight of a first data item, respectively, $S_2$ and $W_2$ are a score and weight of a second data item, respectively, and in a similar fashion, $S_n$ and $W_n$ are a score and weight of a $n^{th}$ data item, respectively, and n is an integer greater than or equal to 2. It should be noted that the corresponding weight of each data item can be set for the particular user and can be adjusted in real time.

As further shown by the intention probe instance 300 of FIG. 3, generally speaking, in the when, where, who, why and how data items, the when item always has the highest weight, followed by the who data item or the where data item. However, the weight of each data item may vary according to actual situations.

As an example, the information collector 110 collects the following information: a user, Tom, has marked a teddy bear toy in a shopping app on his electronic device on Apr. 1, 2022, and he will give teddy bear toy to his daughter as a gift on the Children's Day, and it is known that Children's Day falls on June 1 every year; the information analyzer 120 extracts from the information that Tom needs to buy the marked teddy bear toy by 23:59 on May 31, 2022; and the intention probe generator 130 generates an intention probe "buying a teddy bear toy+by 23:59 on May 31, 2022+a shopping mall+my daughter+the Children's Day" based on the above data. The importance inferencer 140 analyzes the intention probe as follows: firstly, a duration from now to the time when the activity should happen is "greater than 1 month", and thus a score for the when data item is 1; a distance from the current position of Tom to the shopping mall is "greater than 20 kilometers and less than or equal to 50 kilometers", and thus a score for the where data item is 3; the involved person is "my daughter" who is one of my "families", and thus a score for the who data item is 10; the reason is classified as "Anniversary or holiday", and a score for the why data item is 6; the how data item is default, a score for which is 1; if there is no weighting for each data item, a score for the intention probe is 21; if each data item is weighted, for example, the when data item having a weight of 1, the where data item and the who data item each having a weight of 0.8, the why data item having a weight of 0.5 and the how data item having a weight of 0, a score for the intention probe is 15. The importance inferencer 140 infers, based on the score, that the intention probe is less important, and therefore the intention probe has a lower priority in Tom's schedule. However, the information collector 110 collects that Tom happened to visit a customer at the shopping mall where the teddy bear toy is sold on Apr. 15, 2022. In this case, the importance inferencer 140 significantly increases the score of the where data item in the intention probe to 10 according to the current location of the user, so that the importance of the intention probe is significantly increased, and the intention probe obtains an increased priority.

Optionally, in some embodiments, if a duration from the current time to time showing by the when data item is too long, for example, more than one year, the importance inferencer 140 may ignore the intention probe temporarily, to increase a computation rate, and begins to take the intention probe into account when an event closely related to this intention probe happens. For example, Tom's son has just entered high school, and there is still three years away from the time when Tom's son goes to college. The intention probe generator 130 generates, based on the information, an intention probe for Tom "going to college+after 3 years+my son+ . . . ". Although the intention probe is very important to Tom, because the duration from the current time is three years, the importance inferencer 140 does not need to take the intention probe into consideration every time performing intention importance interference. However, when a particular event happens, for example, Tom is near a bookstore that sells books about recommendations for college entrance, or Tom receives a flyer or an advertisement for a college summer camp, the importance inferencer 140 significantly increases the importance of the intention probe, so that Tom can notice this intention probe and perform a corresponding activity Similar situations may also exist for other data items, which will not be listed here.

Back to FIG. 1, the apparatus 100 may further include an information recommender 150. The information recommender 150 is configured to provide information associated with an intention probe with a highest importance. For example, in the above example, once the importance inferencer 140 infers that the intention probe "buying a teddy bear toy+by 23:59 on May 31, 2022+a shopping mall+my daughter+the Children's Day" has the highest importance, the information recommender 150 may provide Tom with the specific location, business hours and/or promotion information, etc. of the shop selling the teddy bear toy.

In some embodiments, the information associated with the intention probe with the highest importance provided by the information recommender 150 can be provided directly to the particular user. For example, the information recommender 150 may be configured to provide the information associated with the intention probe with the highest importance based on the particular user's habits. For example, if the particular user is accustomed to checking his schedule every morning at 8:00 a.m., the information recommender 150 may be configured to provide the particular user with information associated with the intention probe with the highest importance at 8:00 a.m. every day. As another example, the information recommender 150 may be configured to provide information associated with the intention probe with the highest importance in response to a trigger by the particular user. In some embodiments, when the particular user wants to view his/her schedule, he/she can use his/her electronic device to send an instruction to the apparatus 100, to cause the apparatus 100 to determine the intention probe with the highest importance in real-time and provide the information associated with the intention probe with the highest importance. In some other embodiments, the particular user can even simply ask his/her voice assistant "What's important tomorrow?" to trigger the apparatus 100 to determine the intention probe with the highest importance in real-time and provide the information associated with the intention probe with the highest importance. This is an example of a speech-based trigger.

In general, the information recommender 150 may provide information in forms such as a web page, a hyperlink, or audio. Optionally, the information recommender 150 may be connected to an audio output interface, so as to output the information associated with the intention probe with the highest importance in a form of voice, which is particularly beneficial under a condition that it is inconvenient for the user to view an electronic device (for example, when the user is driving).

The information associated with the intention probe with the highest importance provided by the information recommender 150 may be the intention probe itself. For example, in an embodiment to remind the user of the relevant schedule, the information recommender 150 may simply remind the user of the most important event in the schedule.

Optionally, the information associated with the intention probe with the highest importance provided by the information recommender 150 may include an associated business recommendation. For example, when the intention probe with the highest importance involves going to a concert with friends at the city stadium at 8:00 p.m. on Saturday, the information recommender 150 may recommend restaurants within 1 kilometer from the city stadium. Specifically, the information recommender 150 may determine the recommended restaurants based on data related to the particular user's eating habits (e.g., his/her taste, preferred cuisine, acceptable price, etc.), so that the recommended restaurants would be more in line with the user's needs and his/her experience can be improved. The information recommender 150 may generate and dynamically update business recommendation rules based on information of merchants who have established business cooperation with the provider of the apparatus 100 or the service platform on which the apparatus 100 is installed. The provider of the apparatus 100 or the service platform on which the apparatus 100 is installed may charge certain advertisement or service fees from the merchants accordingly.

In some embodiments, the apparatus 100 can dynamically update the data related to different aspects of the particular user through the information analyzer 120. For example, the apparatus 100 can receive information related to the particular user in real time based on the information collector 110, generate a plurality of updated intention probes based on the updated data related to different aspects of the user by the intention probe generator 130, infer an importance for each of the updated intention probes by the importance inferencer 140, and provide information associated with an updated intention probe with a highest importance by the information recommender 150.

According to the embodiments of the present disclosure, the apparatus 100 can automatically collect user information from various channels, extract data related to different aspects of the user therefrom, generate a plurality of intention probes based on the data related to different aspects of the user, infer an importance of each intention probe by calculating a score of each associated data items of the intention probe based on the data related to different aspects of the user, and provide information associated with an intention probe with a highest importance to the user, so that the user can know which intention needs more attention, without the time and effort to go through his/her calendar, mailbox, access a variety of application accounts, and arrange video conference notes, which provides a great convenience for the user. Some embodiments dynamically adjust the score.

It should be noted that, in the embodiments of the present disclosure, each of the intention probe generator 130, the importance inferencer 140, and the information recommender 150 may be implemented by a machine learning model. By machine learning, a behavior pattern and thinking pattern of the particular user can be understood better and better gradually, so as to determine the particular user's intention more accurately, generate corresponding intention probes, infer the importance of each intention probe, and provide recommendations that better meet the particular user's needs, which thus improves the user experience.

In some embodiments, the information associated with the intention probe with the highest importance provided by the information recommender 150 may be provided to other application platforms, so that the other service platforms can better serve the particular user. For example, the apparatus 100 may be integrated into a data management platform to enable the data management platform to accurately determine intentions of a user, infer the importance of each intention, and recommend, based on the inference, information associated with the intention with the highest importance. The data management platform may be integrated (e.g., via an interface) or communicatively connected (e.g., wired or wireless) with other application platforms (e.g., other service platforms, in-vehicle electronics, home electronics, etc.), to push the intention with the highest importance itself and/or information associated with the intention the highest importance to the other application platforms. The provider of the data management platform can charge corresponding service fees from the other application platforms, so as to achieve mutual benefit and win-win results.

Figure 4:
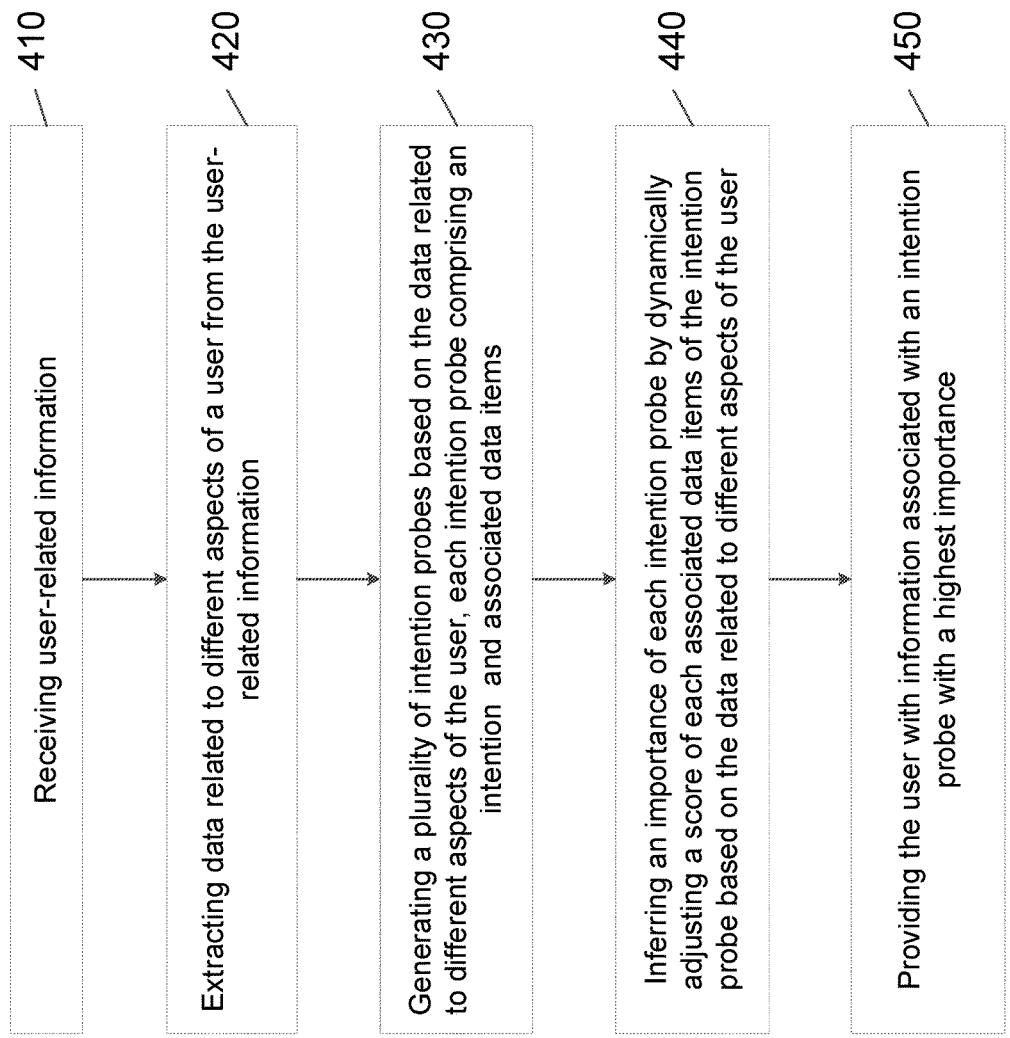
FIG. 4 shows a flowchart of an example process for intention importance interference according to an embodiment of the present disclosure.

FIG. 4 shows a flowchart of an example process 400 for intention importance interference according to an embodiment of the present disclosure. The process 400 may be implemented, for example, by one or more circuits of a computer, server, or any other computing device.

The process 400 may include, at block 410, receiving user-related information. The user-related information may include speech-based information, text-based information, picture-based information, or touch-based information.

The process 400 may include, at block 420, extracting data related to different aspects of a user from the user-related information.

The process 400 may include, at block 430, generating a plurality of intention probes based on the data related to different aspects of the user. Each intention probe may include an intention and associated data items. The data items associated with the intention may include a when, where, who, why and how item, and the like.

The process 400 may include, at block 440, inferring an importance of each intention probe by calculating a score of each associated data items of the intention probe based on the data related to different aspects of the user. For example, an overall score of each intention probe may be calculated based on the score of each associated data item in the intention probe; and then, the importance of each intention probe may be determined by comparing the overall score of each intention probe, for example, the higher the overall score of an intention probe, the more important the intention probe is. For example, calculating the overall score of each intention probe based on the score of each associated data item in the intention probe may include setting a corresponding weight for each data item and calculating a weighted sum of the scores of respective associated data items. The corresponding weight for each data item can be dynamically adjusted based on the data related to different aspects of the user.

The process 400 may further include, at block 450, providing the user with information associated with an intention probe with a highest importance. The associated information may be in a form of a web page, a hyperlink, or audio. The associated information may include commercial information, such as shopping information, service information, and the like.

In some embodiments, process 400 may further include (not shown): updating the data related to different aspects of the user; generating a plurality of updated intention probes based on the updated data related to different aspects of the user; and providing information associated with an updated intention probe with a highest importance.

The process 400 can automatically provide the user with the information associated with the intention probe with the highest importance, so that the user can know which event needs more attentions, without the time and effort to go through his/her calendar, mailbox, access a variety of application accounts, and arrange video conference notes, which provides a great convenience for the user. The data related to different aspects of the user involved in the process 400 can be updated in real time as information related to the user is continuously received from different channels, the intention probes can be updated accordingly, and the score of each associated data item in the intention probe can also be updated, so that the provided recommendations can be more in line with the user's needs, and the user experience can be improved.

More particularly, the process 400 of FIG. 4 may be implemented in one or more components as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the process 400 of FIG. 4 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 5:
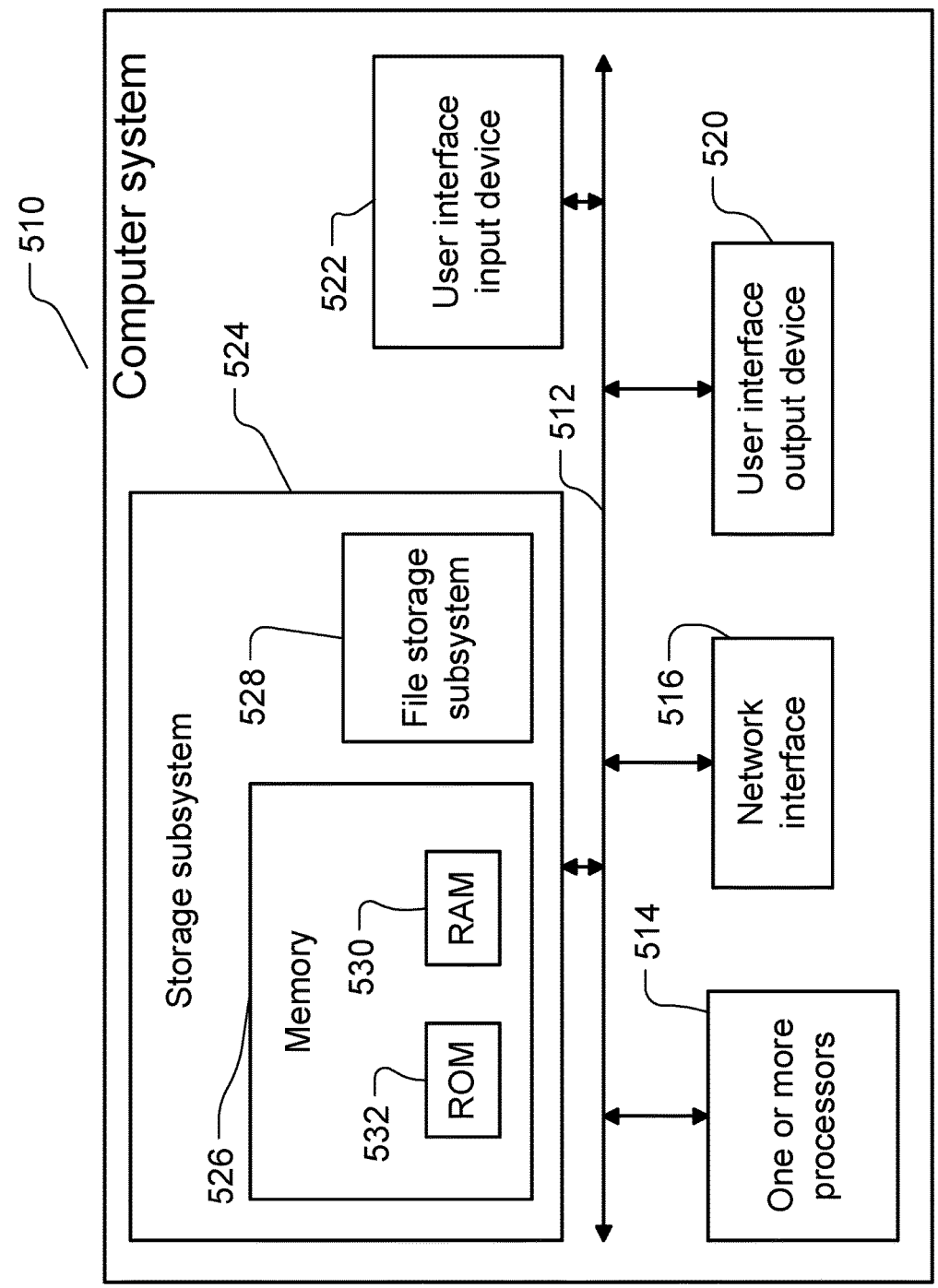
FIG. 5 shows a block diagram of an example computer system including various components for implementing the example process for inferring significance of intention importance interference.

FIG. 5 is a block diagram of an example computer system 510 that can implement the process 400 of FIG. 4. The computer system 510 typically includes at least one processor 514, which communicates with a number of peripheral devices via bus subsystem 512. These peripheral devices may include a storage subsystem 524, comprising for example memory 526 and a file storage subsystem 528, user interface input devices 522, user interface output devices 520, and a network interface subsystem 516. The input and output devices allow user interaction with the computer system 510. The network interface subsystem 516 provides an interface to outside networks and is coupled to corresponding interface devices in other computer systems. The network interface subsystem 516 can provide an interface for wired communication or an interface for wireless communication.

The user interface input devices 522 may include a keyboard, a pointing device such as a mouse, trackball, touchpad, or graphics tablet, a scanner, a touchscreen incorporated into the display, audio input devices such as speech recognition systems, microphones, and other types of input devices. In general, use of the term "input device" is intended to include all possible types of devices and ways to input information into the computer system 510 or onto a communication network. The user interface input device 522 may function as an interface in the present application for receiving a voice query input from the user and providing the received voice query input to the processor 514, so that the processor 514 may implement an intelligent voice query method.

The user interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the computer system 510 to the user or to another machine or computer system.

The storage subsystem 524 stores programs and data constructs that provide the functionality of some or all of the operations described herein. These operations may be implemented by software functions that are generally executed by the processor 514 alone or in combination with other processors.

The memory 526 used in the storage subsystem can include a number of memories including a main random access memory (RAM) 530 for storage of instructions and data during program execution and a read only memory (ROM) 532 in which fixed instructions are stored. A file storage subsystem 528 can provide persistent storage for program and data files, and may include a hard disk drive, a floppy disk drive along with associated removable media, a CD-ROM drive, an optical drive, or removable media cartridges. The software implementing the functionality of certain embodiments may be stored by the file storage subsystem 528 in the storage subsystem 524, or in other machines accessible by the processor.

The bus subsystem 512 provides a mechanism for letting the various components and subsystems of the computer system 510 communicate with each other as intended. Although the bus subsystem 512 is shown schematically as a single bus, alternative embodiments of the bus subsystem may use multiple buses.

The computer system 510 can be of varying types including a workstation, server, computing cluster, blade server, server farm, or any other data processing system or computing device. Due to the ever-changing nature of computers and networks, the description of the computer system 510 depicted in FIG. 5 is intended only as a specific example for purposes of illustrating the various embodiments. Many other configurations of the computer system 510 are possible having more or fewer components than the computer system depicted in FIG. 5.

Various embodiments for intention importance interference have been described in the disclosure. The technology disclosed can be practiced as a method, apparatus or article of manufacture (a non-transitory computer readable medium storing code). An apparatus implementation of the disclosed technology includes one or more processors coupled to memory. The memory is loaded with computer instructions that perform various operations. An article of manufacture implementation of the disclosed technology includes a non-transitory computer readable medium (CRM) storing code that, if executed by one or more computers, would cause the one or more computers to perform various operations.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A data processing apparatus, comprising:
   an interface configured to receive user-related information of a user from a plurality of channels; and
   a processor coupled to the interface and configured to:
   extract, via a speech recognition system, intention data from the user-related information from the plurality of channels;
   generate a plurality of intention probes based on the intention data related to the user, each intention probe comprising a user task to be performed within a predetermined period of time and associated data items related to the user task;
   receive, within the predetermined period of time, changes of the associated data items related to the user task via the user-related information from the plurality of channels;
   continuously infer a plurality of importance scores of each intention probe of the plurality of intention probes by calculating a sum of the plurality of importance scores of associated data items for each intention probe related to the user task over the predetermined period of time;
   determine an intention probe with a highest score based on the calculated sum for each intention probe;
   provide, via an audio output interface, audio output associated with the determined intention probe to remind the user about the user task; and
   terminate the intention probe at the expiration of the predetermined period of time.

2. The apparatus of claim 1, wherein the user-related information includes speech-based information, and the processor is configured to extract an abstract from a transcript of the speech-based information, and obtain the intention data based on the abstract.

3. The apparatus of claim 1, wherein the processor is configured to:
   upon detection of a user task in the data related to aspects of the user, generate a corresponding intention probe corresponding to the user task; and
   keep the corresponding intention probe active until the user task happens or the corresponding intention probe expires.

4. The apparatus of claim 1, wherein the processor is configured to:
   adjust the plurality of importance scores dynamically; and
   infer the importance of the intention probe based on the sum of scores of the associated data items of the intention probe.

5. The apparatus of claim 1, wherein the user task comprises one or more activities, the associated data items comprise timing and location information as the user input data to implement the one or more activities, and the processor is configured to:

change the importance of the intention probe by calculating a score of the timing and location information to implement the one or more activities in the intention probe.

6. The apparatus of claim 1, wherein the processor is configured to provide the audio output associated with the intention probe in response to a speech-based trigger of the user.

7. The apparatus of claim 1, wherein the processor is further configured to:
update the intention data over the predetermined period of time;
generate a plurality of updated intention probes based on the updated intention; and
provide information associated with an updated intention probe with a highest importance.

8. A data processing method, comprising:
receiving user-related information of a user from a plurality of channels;
extracting, via a speech recognition system, intention data from the user-related information from the plurality of channels;
generating a plurality of intention probes based on the intention data related to the user, each intention probe comprising a user task to be performed within a predetermined period of time and associated data items related to the user task;
receiving, within the predetermined period of time, changes of the associated data items related to the user task via the user-related information from the plurality of channels;
continuously inferring a plurality of importance scores of each intention probe of the plurality of intention probes by calculating a sum of the plurality of importance scores of associated data items for each intention probe related to the user task over the predetermined period of time;
determining an intention probe with a highest importance score based on the calculated sum for each intention probe;
providing, via an audio output interface, audio output associated with the determined intention probe to remind the user about the user task; and
terminating the intention probe at the expiration of the predetermined period of time.

9. The method of claim 8, wherein the user-related information-includes speech-based information, and the method comprises extracting an abstract from a transcript of the speech-based information, and obtaining the intention data based on the abstract.

10. The method of claim 8, further comprising:
upon detection of a user task in the data related to aspects of the user, generating an intention probe corresponding to the user task; and
keeping the corresponding intention probe active until the-user task happens or the intention probe expires.

11. The method of claim 8, further comprising: adjusting the plurality of importance scores dynamically; and inferring the importance of the intention probe based on the sum of scores of the associated data items of the intention probe.

12. The method of claim 8, wherein the user task comprises one or more activities, the associated data items comprise timing and location information as the user input data to implement the one or more activities, and the method further comprises:

changing the importance of the intention probe by calculating a score of the timing and location information to implement the one or more activities in the intention probe.

13. The method of claim 8, further comprising providing the audio output associated with the intention probe in response to a speech-based trigger of the user.

14. The method of claim 8, further comprising:
updating the intention data over the predetermined period of time;
generating a plurality of updated intention probes based on the updated intention; and
providing information associated with an updated intention probe with a highest importance.

15. A non-transitory computer readable medium storing instructions that, if executed by one or more processor, would cause an apparatus to perform a method comprising:
receiving user-related information of a user from a plurality of channels;
extracting, via a speech recognition system, intention data from the user-related information from the plurality of channels;
generating a plurality of intention probes based on the intention data related to the user, each intention probe comprising a user task to be performed within a predetermined period of time and associated data items related to the user task;
receiving, within the predetermined period of time, changes of the associated data items relate to the user task via the user-related information from the plurality of channels;
continuously inferring a plurality of importance scores of each intention probe of the plurality of intention probes by calculating a sum of the plurality of importance scores of associated data items for each intention probe relate to the user task over the predetermined period of time;
determining an intention probe with a highest importance score based on the calculated sum for each intention probe;
providing, via an audio output interface, audio output associated with the determined intention probe to remind the user about the user task; and
terminating the intention probe at the expiration of the predetermined period of time.

16. The non-transitory computer readable medium of claim 15, wherein the user-related information includes speech-based information, and the method comprises extracting an abstract from a transcript of the speech-based information, and obtaining the intention data based on the abstract.

17. The non-transitory computer readable medium of claim 15, comprising:
upon detection of an user task in the data related to aspects of the user, generating a corresponding intention probe corresponding to the user task; and
keeping the corresponding intention probe active until the user task happens or the corresponding intention probe expires.

18. The non-transitory computer readable medium of claim 15, further comprising: adjusting the plurality of importance scores dynamically; and inferring the importance of the intention probe based on the sum of scores of the associated data items of the intention probe.

19. The non-transitory computer readable medium of claim 15, wherein, the user task comprises one or more activities, the associated data items comprise timing and location information as the user input data to implement the one or more activities, and the method further comprises:

changing the importance of the intention probe by calculating a score of the timing and location information to implement the one or more activities in the intention probe.

20. The non-transitory computer readable medium of claim 15, further comprising providing the audio output associated with the intention probe in response to a speech-based trigger of the user.

21. The non-transitory computer readable medium of claim 15, further comprising:

updating the intention data over the predetermined period of time;

generating a plurality of updated intention probes based on the updated intention; and providing information associated with an updated intention probe with a highest importance.

\* \* \* \* \*